H. R. DEILEY.
AUTOMOBILE SAFETY SIGNAL.
APPLICATION FILED JULY 8, 1918.
1,351,773. Patented Sept. 7, 1920.
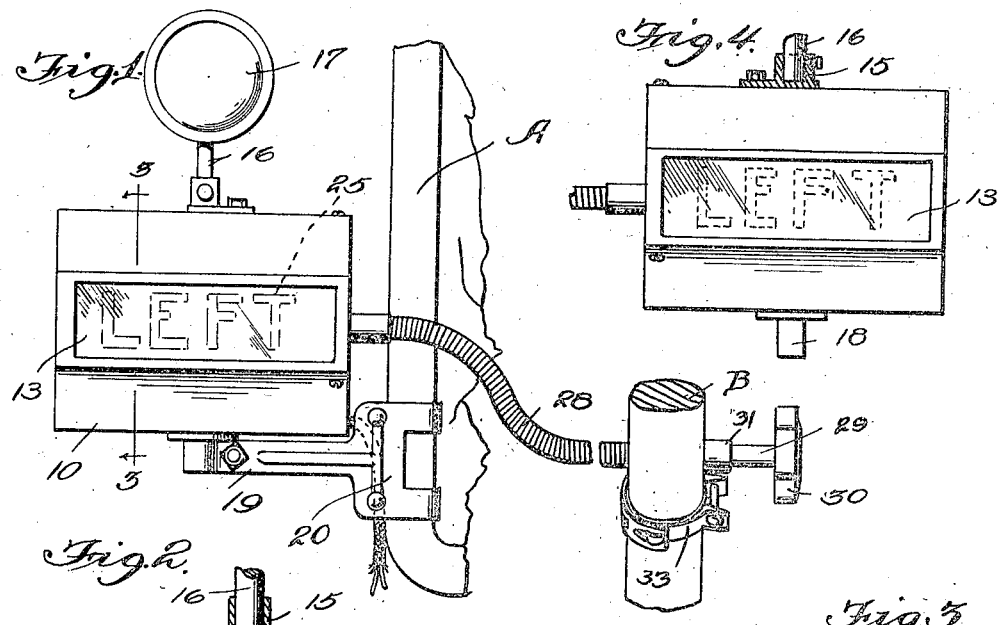
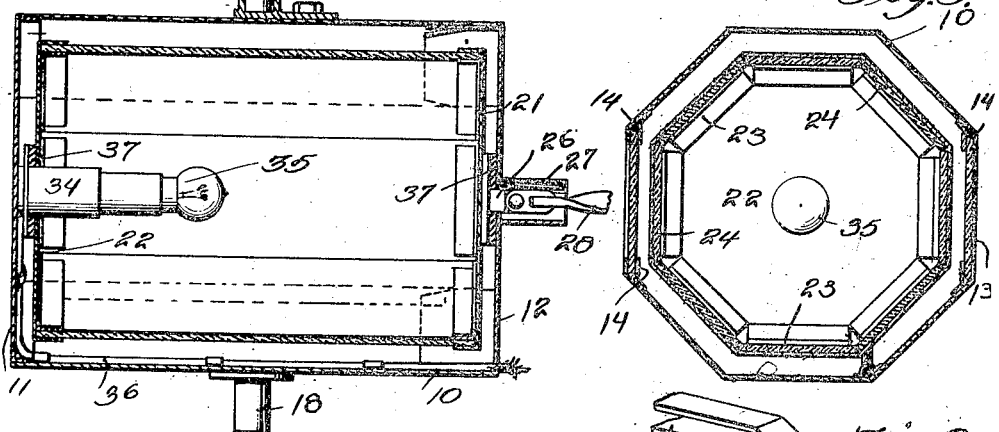
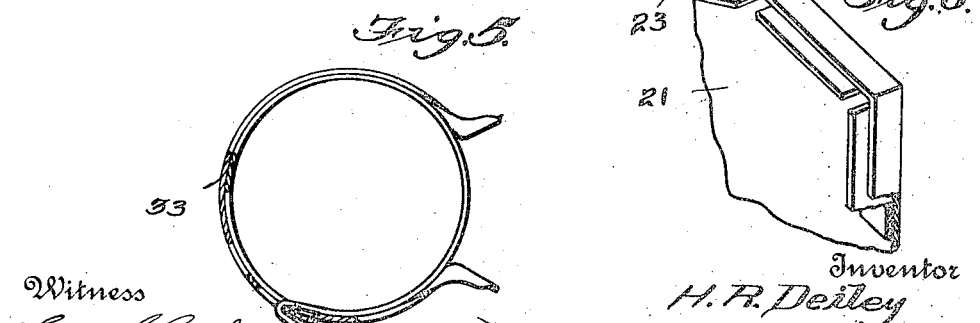
Witness
Ernest H. Croker
F. O. Parker
Inventor
H. R. Deiley
By Charles Chandler
Attorney

UNITED STATES PATENT OFFICE.

HARVEY R. DEILEY, OF BETHLEHEM, PENNSYLVANIA, ASSIGNOR OF ONE-HALF TO JOHN T. LINDSTROM, OF ALLENTOWN, PENNSYLVANIA.

AUTOMOBILE SAFETY-SIGNAL.

1,351,773.      Specification of Letters Patent.      Patented Sept. 7, 1920.

Application filed July 8, 1918. Serial No. 243,891.

*To all whom it may concern:*

Be it known that I, HARVEY R. DEILEY, a citizen of United States, residing at Bethlehem, in the county of Northampton, State of Pennsylvania, have invented certain new and useful Improvemenets in Automobile Safety-Signals; and I do hereby declare the following to be a full, clear, and exact description of the invention, such as will enable others skilled in the art to which it appertains to make and use the same.

This invention relates to a visible signal, and more particularly to the class of manually adjustable safety signaling devices or attachments for automobiles or the like.

The primary object of the invention is the provision of a signaling device or attachment of this character, wherein the same is visible both by day and night and is operated from the steering column or post of an automobile for the convenient adjustment thereof, and will indicate the contemplated direction of movement of the automobile to the traffic, traffic officer and pedestrians, thereby eliminating collisions, accidents and the loss of life or limb resulting from the confusion of mind relative to the intentions of the driver of the automobile.

Another object of the invention is the provision of a signal of this character, wherein the same can be conveniently mounted and adjusted upon an automobile or other vehicle to suit the fancy of the user.

A further object of the invention is the provision of a device of this character, which is extremely simple in construction, readily and easily applied to and removed from an automobile, or the like, conveniently adjusted, strong, durable and inexpensive to manufacture.

With these and other objects in view, the invention consists in the features of construction and combination described, illustrated in the accompanying drawings and pointed out in the claims hereunto appended. However, it is understood that changes, variations and modifications may be made in the invention such as come properly within the scope of the appended claim.

In the accompanying drawings:

Figure 1 is a fragmentary elevation of a portion of a wind shield and the steering post of an automobile, showing the signaling device constructed in accordance with the invention applied;

Fig. 2 is an enlarged vertical longitudinal sectional view through the signal box;

Fig. 3 is a sectional view on the line 3—3 of Fig. 1, looking in the direction of the arrow;

Fig. 4 is a view showing the front of the signal box or housing;

Fig. 5 is a detail plan view of the clamping ring for the signal adjuster, the ring being partly in section; and Fig. 6 is a fragmentary perspective view of a portion of an end plate of the rotor.

Similar reference characters indicate corresponding parts throughout the several views in the drawings.

Referring to the drawings in detail, A designates a portion of a frame of a wind shield which is of the usual well known construction, and is merely illustrative of the application of the signaling device, although the latter may be otherwise supported upon a vehicle, and B a portion of the steering column or post of said vehicle, the signaling device or attachment being constructed and supported in a manner hereinafter fully described.

The signaling device or attachment comprises a box or housing 10, preferably made from sheet metal and of octagon shape in cross section, although it may be made from any other suitable material and any other shape desired, the ends 11 and 12 of said box or housing removably telescoped in the open ends thereof, yet one of the same may be made permanent and the other removable. Formed in the front and rear of the box or housing, are suitable openings or windows, covered by transparent panels 13 which are mounted interiorly thereof in cleats 14, while at the top of said box or housing is arranged a suitable socket member 15 for detachably and adjustably receiving the standard or post 16 of a mirror 17, which makes visible to the driver of the automobile the rear end traffic, as usual.

Mounted at the bottom of the box or housing is a stud or lug 18 which is detachably engaged in the arm 19 of a clamping bracket 20 constituting a support and adapted to shiftable engagement with the frame A of the wind shield, or upon any other part of the automobile.

Rotatably fitted within the box or housing 10 is an illuminable signal panel rotor comprising a pair of end disks 21 and 22, respectively, which are peripherally shaped corresponding to the box or housing 10. Each disk or plate 21 and 22 has its edge portion turned at right angles to the plane of the disk as shown at 23' to form a continuous wall which in the present instance is shown as octagonal, while in parallel spaced relation to each straight section of the wall there is secured to the corresponding face of the disk, a cleat 23. In the channel between each cleat and the corresponding section of the wall, there is removably engaged a translucent plate or panel 24, as illustrated. Mutually opposite panels are similarly marked, with the exception of one pair, which includes a white unmarked panel for exposure at the front opening and a red unmarked panel for exposure simultaneously at the rear opening of the casing, the remaining pairs of panels being marked "Right," "Left" and "Stop" respectively. Thus, the contemplated manipulations may be indicated.

On separation of the end disks 21 and 22 of the rotor, the panels 24 are removable for changing or substitution. On the end disk 21 centrally thereof is a trunnion 26 which is journaled in the end 12 of the box or housing 10 and is concealed in a hollow boss 27 on the latter, the trunnion 26 being connected with an operating shaft 28 which is connected with a turning stem 29 journaled in a bearing 31 on the clamping bolt 32 of a clamping collar or ring 33, which is preferably in two sections adjustably connected to each other for the accommodation of different sizes of steering posts or columns, the ring or collar 33 being clamped about the post or column B, to position conveniently to the driver of the automobile the hand wheel 30 at the end of the stem 29.

The disk 22 of the other end of the rotor revolves upon a journal 34 projected inwardly and centrally from the end 11 of the housing or box 10 and constitutes an electric bulb socket for an elastic bulb 35, in circuit with a suitable source of electricity for illumination to such panels 24 as are at the window openings of the casing.

Surrounding the stud 26 and the journal 34 are rubber washers 37 which bear on the rotor and housing 10 and hold the rotor against free rotation and displacement from vibration. These washers likewise press the end disks of the rotor toward each other so that the panels 24 which in practice are of glass, are prevented from rattling.

In the use of the signal, the rotor is adjusted to display predetermined indicia from opposite sides of the box or housing 10 to be visible by day and night to the traffic or pedestrians for indicating the contemplated direction of travel of the vehicle collisions, accidents and confusion.

From the foregoing it is thought that the construction and the manner of operation of the signal will be clearly understood, and therefore a more extended explanation has been omitted.

What is claimed is:

A safety signal comprising a housing having heads closing its ends, an indicating drum rotatably mounted in the housing and having heads provided with inwardly extending flanges, cleats extending from the heads of the drum in operative relation to the flanges, panels positioned between the heads of the drum and engaged by the flanges and cleats, and washers of resilient material positioned between the heads of the drum and heads of the housing to move the heads of the drum toward each other for tight engagement with the panels and further providing frictional brake means for the drum.

In testimony whereof, I affix my signature, in the presence of two witnesses.

HARVEY R. DEILEY.

Witnesses:
ERWIN L. GETTIN,
C. H. BEACHAM.